United States Patent
Mowrey et al.

(10) Patent No.: US 6,627,691 B2
(45) Date of Patent: Sep. 30, 2003

(54) AQUEOUS RESIN ADHESIVE COMPOSITION HAVING PRE-BAKE RESISTANCE

(75) Inventors: Douglas H. Mowrey, Titusville, PA (US); Rebecca S. Cowles, Wattsburg, PA (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 09/894,751

(22) Filed: Jun. 28, 2001

(65) Prior Publication Data

US 2003/0018117 A1 Jan. 23, 2003

(51) Int. Cl.$^7$ .............................. C08J 3/00; C08K 3/34; C08L 73/00; C08L 61/04; B32B 27/00
(52) U.S. Cl. ...................... 524/492; 524/430; 524/493; 524/508; 524/509; 524/510; 156/333; 428/424.7
(58) Field of Search .................................. 524/492, 430, 524/493, 508, 509, 510; 156/333; 428/424.7

(56) References Cited

U.S. PATENT DOCUMENTS

| | | |
|---|---|---|
| 3,968,067 A | 7/1976 | Burke, Jr. |
| 4,070,825 A | 1/1978 | Kronogard |
| 4,145,816 A | 3/1979 | Stobbe et al. |
| 4,243,566 A | 1/1981 | Burke, Jr. |
| 5,093,203 A | 3/1992 | Mowrey et al. |
| 5,200,455 A | 4/1993 | Warren |
| 5,354,805 A | 10/1994 | Treat et al. |
| 5,496,884 A | 3/1996 | Weih et al. |
| 6,103,786 A | 8/2000 | Hoch et al. |

*Primary Examiner*—Patrick D. Niland
(74) *Attorney, Agent, or Firm*—Miles B. Dearth

(57) ABSTRACT

An aqueous adhesive composition, as for bonding nitrile rubbers to a metal substrate, has very good pre-bake resistance. The adhesive composition comprises a phenolic novolac or resole resin, chlorinated natural rubber, a reactive fillers, and precipitated silica. Utilization of the adhesive composition results in essentially failure of the nitrile rubber.

20 Claims, No Drawings

US 6,627,691 B2

AQUEOUS RESIN ADHESIVE COMPOSITION HAVING PRE-BAKE RESISTANCE

FIELD OF INVENTION

The present invention relates to a water based dispersed adhesive which contains a phenolic resin, chlorinated natural rubber and unexpectedly has improved pre-baked properties when precipitated silica is utilized.

BACKGROUND OF THE INVENTION

Heretofore, phenolic resin compositions have been utilized for bonding rubber to metal. While solvent based systems have generally had good pre-bake properties, apparently no known aqueous system exists which has good bonding of a rubber such as a nitrile to a metal as well as good pre-bake resistant properties. U.S. Pat. No. 5,093,203 relates to a rubber-metal adhesive system which contains a primer component and an overcoat component. The primer component includes a polychloroprene compound, a phenolic resin, and a metal oxide while the overcoat component preferably contains a nitroso compound, a halogenated polyolefin, and a metal oxide or salt. When applied between a metal surface and a rubber substrate under heat and pressure, the adhesive system provides a flexible rubber-metal bond which will withstand high temperature fluid environments.

U.S. Pat. No. 5,200,455 relates to a aqueous primer composition containing a polyvinyl alcohol-stabilized aqueous phenolic resin dispersion, a latex of a halogenated polyolefin, and a metal oxide. The phenolic resin dispersion is prepared by mixing (a) a pre-formed, solid substantially water-insoluble, phenolic resin; (b) water; (c) an organic coupling solvent; and (d) polyvinyl alcohol, at a temperature and for a period of time sufficient to form a dispersion of said phenolic resin in water. The aqueous primer composition substantially reduces the utilization of organic solvents, is resistant to pre-bake conditions, and provides for a robust adhesive bond which is flexible and resistant to adverse environments.

U.S. Pat. No. 5,354,805 relates to an aqueous adhesive composition for bonding nitrile rubber. The adhesive composition contains a chlorosulfonated polyethylene latex, a polyhydroxy phenolic resin copolymer, and a high molecular weight aldehyde polymer. The adhesive composition exhibits an unusual affinity for nitrile rubber and exhibits excellent adhesive performance as a single-coat formulation. The adhesive composition withstands high temperature bonding conditions and minimizes the utilization of volatile organic solvents.

U.S. Pat. No. 5,496,884 relates to an adhesive composition containing a polyvinyl alcohol-stabilized butadiene polymer latex and a methylene donor compound. The butadiene polymer latex is prepared by an emulsion polymerization in the presence of polyvinyl alcohol. The adhesive composition may also contain other optional ingredients such as a supplemental polymeric film-forming component, a nitroso compound crosslinker, a maleimide compound crosslinker, a vulcanizing agent, and an acid-scavenging compound. The polyvinyl alcohol-stabilized butadiene polymer latex and methylene donor compound combine to provide a tightly crosslinked, robust film which provides for excellent adhesion and environmental resistance.

SUMMARY OF INVENTION

An adhesive for bonding rubber such as acrylonitrile to metal comprises a phenolic resin, chlorinated natural rubber, a reactive filler such as zinc oxide, and the use of a precipitated silica which unexpectedly results in very good pre-baked resistance. Moreover, the adhesive composition is environmentally friendly in that it is water-based.

DETAILED DESCRIPTION OF THE INVENTION

The phenolic resin is desirably a novolac or a resole type which contains methylene bridge and/or alcohol groups. Such resins are known to the art and to the literature with suitable examples set forth in U.S. Pat. Nos. 5,200,455; 5,354,805; and 5,496,884, hereby fully incorporated by reference.

A desired phenolic novolac resin is set forth in U.S. Pat. No. 5,354,805 and is a polyhydroxy phenolic resin copolymer which comprises a phenolic resin prepared from certain multihydroxy aromatic compounds and a formaldehyde source. Specifically, the phenolic resin copolymer of the present invention is prepared by combining a monohydroxy and/or a dihydroxy aromatic compound, as a first phenolic component, with a trihydroxy aromatic compound, as a second phenolic component, and a formaldehyde source under reaction conditions sufficient to create a phenolic resin copolymer.

The monohydroxy, dihydroxy and trihydroxy aromatic compounds of the present invention can be essentially any aromatic compound having one, two and three hydroxy substituents, respectively. The aromatic compound is preferably benzene, and the other non-hydroxy substituents on the benzene ring or other aromatic compound may be hydrogen, alkyl, aryl, alkylaryl, arylalkyl carboxy, alkoxy, amide, imide, halogen or the like. The non-hydroxy substituents are most preferably hydrogen and, if alkyl, are preferably lower alkyls having from 1 to 10 carbon atoms including methyl, ethyl, propyl, amyl, and nonyl. Representative monohydroxy compounds include phenol, p-t-butyl phenol, p-phenylphenol, p-chloro-phenol, p-alkoxyphenol, O-cresol, m-cresol, o-chlorophenol, m-bromo-phenol, 2-ethylphenol, amyl phenol, and nonyl phenol, with phenol, p-t-butyl phenol and nonyl phenol. being preferred. Representative dihydroxy compounds include resorcinol, hydroquinone and catechol with resorcinol being the preferred dihydroxy aromatic compound. The monohydroxy aromatic compound, dihydroxy aromatic compound or combination thereof comprises the first phenolic component and is utilized in the invention in an amount from about 1 to about 97, preferably from about 75 to about 95 percent by weight of the ingredients (excluding solvent) utilized to prepare the phenolic resin copolymer.

Representative trihydroxy compounds include pyrogallol, gallates such as propyl gallate, robinerin, baptigenin and anthragallol, with pyrogallol being the preferred trihydroxy aromatic compound. The trihydroxy aromatic compound comprises the second phenolic component and is utilized in the invention in an amount from about 1 to about 97, preferably from about 2 to about 25 percent by weight of the ingredients (excluding solvent) utilized to prepare the phenolic resin copolymer.

It should be noted that it is believed that the effectiveness of the present phenolic resin copolymer is based on the presence of the trihydroxy aromatic compound (the second phenolic component) in the copolymer, and therefore, the trihydroxy aromatic compound is an essential component of the copolymer. The first phenolic component of the copolymer may be a monohydroxy aromatic compound, a dihydroxy aromatic compound, or a combination thereof.

However, the use of at least one dihydroxy aromatic compound in the first phenolic component of the invention has been shown to exhibit exceptional bonding ability (possibly due to the numerous hydroxy groups present in the resulting copolymer), and a dihydroxy aromatic compound is therefore particularly preferred for use in the first phenolic component of the invention.

The present phenolic resin copolymer requires a formaldehyde source in order to react with the multihydroxy aromatic compounds to form a novolak phenolic resin copolymer. The formaldehyde source can essentially be any type of formaldehyde known to react with hydroxy aromatic compounds to form novolak phenolic resins. Typical compounds useful as a formaldehyde source in the present invention include formaldehyde and aqueous solutions of formaldehyde, such as formalin; acetaldehyde; propionaldehyde; isobutyraldehyde; 2-ethylbutyraldehyde; 2-methylpentaldehyde; 2-ethylhexaldehyde; benzaldehyde; as well as compounds which decompose to formaldehyde, such as paraformaldehyde, trioxane, furfural, hexamethylenetetramine; acetals which liberate formaldehyde on heating; and the like. The formaldehyde source is utilized in an amount ranging from about 1 to about 25, preferably from about 5 to about 20 percent by weight of the ingredients utilized to prepare the phenolic resin copolymer. When utilizing an aqueous solution of formaldehyde such as formalin, the percent by weight of formaldehyde source is based on actual formaldehyde content.

The phenolic resin copolymer is typically prepared by first dissolving the first phenolic component and the second phenolic component in a suitable solvent. Solvents useful for this purpose include water; ether alcohols, such as the commercially available propylene glycol monoethyl ether sold as DOWANOL PM by the Dow Chemical Company; methylisobutyl ketone; toluene; xylene; perchloroethylene; and mixtures thereof; with DOWANOL PM or an approximately 1:2 DOWANOL PM/water mixture being the preferred solvents. A catalytic amount of an acid such as concentrated phosphoric acid, oxalic acid, sulfuric acid, hydrochloric acid or nitric acid, preferably phosphoric acid, is then added to the dissolved hydroxy compound mixture and the temperature of the mixture is raised to between about 80° C. and about 110° C. The formaldehyde source is then added to the mixture at a constant rate over a period of about 30 minutes to about 1 hour. After the resulting exothermic reaction is complete and the corresponding heat evolution is complete, the mixture is then held at a temperature between about 80° C. and about 120° C. for a period of time ranging from about 30 minutes to about 2 hours in order to insure completion of the polymerization reaction. The mixture is allowed to cool to room temperature. The final resin copolymer has a solids content of between about 30 and about 70, preferably between about 40 and about 60 weight percent, and contains about 15 percent organic solvent, accounting for all of the organic solvent contained in the final adhesive. The phenolic resin copolymer typically has a number average molecular weight of between about 500 and about 1500, preferably between about 750 and about 1000.

A preferred phenolic novalac resin is a pyrogallon/Resorcinol/Formaldehyde wherein respectively the ratio of the various components is about 0.04/0.96/0.60 Equivalents, made by Lord Corporation.

In addition to the above phenolic novolac resins, another suitable resin is a phenolic resole resin which generally contains methylene bridging groups as well as alcohol groups. This type of phenolic resin is also known to the art and to the literature with suitable examples set forth in U.S. Pat. No. 5,200,455, hereby fully incorporated by references. Examples of such phenolic resole resins include BKUA 2370 and GPRI4001 made commercially by Georgia Pacific.

The total solid concentration of the various phenolic resin in water can generally vary from about 10% to about 70% and desirably from about 25% to about 60%, and preferably from about 40% to about 50% % by weight.

The utilization of a chlorinated natural rubber latex is very important in forming the aqueous rubber phenolic resin composition of the present invention inasmuch as generally other types of rubbers, halogenated and non-halogenated, and the like do not result in good pre-baked properties. Accordingly, other types of rubbers are excluded. If utilized, they exist in small amounts such as less than about 25, desirably less than about 10, and preferably less than about 5 parts by weight (dry) per 100 parts by weight (dry) of the phenolic resin. Aqueous dispersions of halogenated or preferably chlorinated natural rubbers are made by conventional techniques for producing aqueous dispersions. Examples of suitable processes and chlorinated natural rubbers which can be utilized are set forth in U.S. Pat. Nos. 3,968,067; 4,070,825; 4,145,816; 4,243,566; and 6,103,786; the entire disclosure of each is hereby fully incorporated by reference. Generally the various processes involve dissolving the elastomer in an organic solvent, followed by forming a water-based dispersion thereof with the aid of a surfactant. Any remaining solvent can be removed as by stain stripping. The chlorinated natural rubber generally contains from about 60% to about 75% and desirably from about 65% to about 68% by weight of chlorine therein based upon the total weight of the natural rubber. The chlorinated natural rubber latex generally contains from about 25 to about 75 and desirably from about 40 to about 60 weight percent of solids.

The amount of the chlorinated natural rubber per se, that is on a dry weight basis, generally ranges from about 50 to about 150 parts by weight and desirably from about 90 to about 115 parts by weight for every 100 parts by weight of the dry phenolic resin.

The reactive fillers of the present invention, which can have the function of curing agents, acid scavengers, or anti-corrosive pigments, include oxides or salts of iron, nickel, cobalt, copper, and aluminum, and desirably zinc and calcium. Suitable anions include carbonate, phosphate, sulfate, nitrate, and the like. Examples of specific reactive fillers include the oxides, phosphates, and carbonates of zinc or calcium such as calcium carbonate, zinc phosphate, and zinc oxide. The reactive fillers are generally added as a dry component and the amount thereof is generally from about 25 to about 75 parts by weight and desirably from about 45 to about 60 parts by weight per 100 parts by weight of the dry phenolic resin.

While not fully understood, it has been found that precipitated silicas and preferably amorphous precipitated silicas have unexpectedly been found to yield good pre-bake resistance whereas fumed silicas do not work and thus are excluded. If any fumed silica is utilized, the amount thereof is low, i.e. generally less than about 5, desirably less than about 3 and preferably less than about 1 part by weight (dry) per 100 parts by weight of dry phenolic resin. The precipitated silicas are generally spherical and have an average age diameter of from about 0.005 or about 0.010 to about 0.030, or about 0.050, or about 0.100 and desirably from about 0.015 to about 0.025 micrometers. The surface area is generally from about 130 to about 170 and preferably from about 140 to about 150 square meters per gram. Examples of such commercially available precipitated silicas include Cabosil CP304 made by Cabot Corporation of Kokoma, Ind.; Aerosil 200 made by Degussa Corporation of Ridgefield Park, N.J. with various HiSils such as HiSil 233 made by PPG of Pittsburgh, Pa., being especially preferred.

Such preferred precipitated silicas, for example HiSil 233 as well as other HiSil 200 series silicas, are a synthetic white, amorphous silica (silicone dioxide) powders and pellets. They are classed as wet-process, hydrated silicas because they are produced by a chemical reaction in a water solution, from which they are precipitated as ultra-fine, spherical particles having an average diameter as noted above. The particles tend to agglomerate in a loose structure which looks like a grape cluster when magnified by an electron microscope. The surface areas of such precipitated silicas are very large, as noted above. Generally, less than 0.03% by weight of residual particles are retained on a 100 mesh U.S. standard screen.

The amount of the precipitated silica on a dry weight basis is generally from about 10 to about 50 parts and desirably from about 25 or 30 to about 40 or 45 parts by weight per 100 parts dry weight of the phenolic resin.

As noted above, the aqueous rubber to metal adhesive compositions of the present invention have very good pre-bake resistance. Pre-bake resistance can be defined as a capability of tolerating a pre-bake cycle of about 3 or about 6 minutes and especially about 9 minutes at 380° F. and still maintain the capability of providing approximately 100% rubber tearing bonds when used as an adhesive bonding nitrile rubber to a rigid substrate such as zinc phosphated steel during vulcanization of the nitrile rubber compound. That is, even though heated for up to 3, 6, or 9 minutes at 380° F. before any cure of the nitrile rubber, after cure of the rubber, the adhesive does not fail but rather generally at least 80%, desirably at least 85% or 90% and preferably at least 95% or 100% of the nitrile rubber (bonds) tears during testing of the laminate. Pre-baked resistance is often very desirable since with regard to adhesive coated seals, adhesive movement is prevented when unvulcanized rubber moves across the pre-baked adhesive during a molding step. Another important advantage is that when loading molds which are preheated to a molding temperature of up to about 400° F., adhesive coated inserts can be exposed to these temperatures for up to several minutes prior to rubber contact and cure initiation. The adhesive must resist pre-curing as a result of such heat exposure. Should the adhesive be pre-cured, the same will typically fail at the rubber-adhesive interface and not provide for desired rubber retention when destructively tested.

The phenolic adhesive composition can also contain conventional additives, such as plasticizers, dispersing and wetting agents, surfactants, fillers, pigments, reinforcing agents, and the like in conventional amounts. For example, generally any type of carbon black can be utilized such as those having low to high DBP absorption (cc/100 g) as from about 50 to about 160 over a wide range of nitrogen adsorption (sq.m/g) as from about 20 to about 150. The amount of carbon black is generally very small and not critical such as from about 0.5 to about 10 parts of dry weight for every 100 parts of dry weight of the phenolic resin. Another common additive are various lignosulphonate wood biproducts which readily dispense pigments, etc., in water such as Marasperse made by Ligno Tech of Rothchild, Wis. Such products are also utilized on a very small basis such as from about 0.5 to about 10 dry parts by weight for every 100 dry parts by weight of the phenolic resin.

Methylene donors are known to the art and to the literature such as gamma-polyoxymethylene, or hexamethylenetetramine, or paraformaldehyde as crosslinkers for phenolic resins (formaldehyde donors/methylene donor)). The amount of such crosslinking agents is generally from about 5 to about 40 and desirably from about 15 to about 25 dry parts by weight per every 100 dry parts by weight of the phenolic resin.

Various pigments which can also serve as fillers can be utilized such as titanium dioxide, and the amounts as from about 10 to about 50 and desirably from about 25 to about 40 parts by dry weight per every 100 parts of dry weight of the phenolic resin.

Other additives which can also be utilized include various colorants, dyes, clays, graphite, and the like.

Water, preferably deionized water, is utilized in combination with the essential components and any optional components of the present invention in order to provide an adhesive composition having a final solids content of between about 10 and about 70 weight percent, preferably between about 15 or 30 and about 40 or 45 weight percent.

The adhesive compositions of the present invention may be prepared by any method known in the art, but are preferably prepared by combining and milling or shaking the ingredients and water in a ball-mill, sand-mill, pebble-mill, ceramic bead-mill, steel bead-mill, high speed media-mill, or the like.

The adhesive compositions of the invention are preferably utilized to bond or adhere nitrile rubber to a metal surface. The composition may be applied to the metal surface by spraying, dipping, brushing, wiping or the like, after which the adhesive is permitted to dry. The coated metal surface and nitrile rubber are then brought together under heat and pressure to complete the bonding procedure. The surface of the metal and the nitrile rubber are typically brought together under a pressure of from about 20.7 to 172.4 Mega Pascals (MPa), preferably from about 20 MPa to 50 MPa. The resulting rubber-metal assembly is simultaneously heated to a temperature of from about 140° C. to about 210° C., preferably from about 175° C. to about 200° C. The assembly should remain under the applied pressure and temperature for a period of from about 1 minute to 60 minutes, depending on the cure rate and thickness of the rubber substrate. This process may be carried out by applying the rubber substrate as a semi-molten material to the metal surface as in, for example, an injection-molding process. The process may also be carried out by utilizing compression molding, transfer molding or autoclave curing techniques. After the process is complete, the bond is fully vulcanized and ready for use in a final application.

The nitrile rubber compositions of the present invention are generally conventional. The nitrile rubbers are made from a conjugated diene having from 4 to about 8 carbon atoms such as 1,3-butadiene generally in an amount of from about 60% to about 80% by weight with the remainder being the weight of the acrylonitrile content. Such rubbers are conventional an well known to the art and can be obtained from Zeon Chemicals Inc. of Louisville, Ky. The nitrile rubber can be sulfur cured, peroxide cured, or the like and can have a high or low modulus. Furthermore, the nitrile rubber can be hydrogenated or carboxylated, and made by emulsion polymerization. One of the advantages of the adhesive compositions of the present invention is that they effectively bond to wide variety of nitrile rubbers.

Although preferred for use in bonding nitrile rubber to a metal or to a primed metal surface, the present adhesive compositions may be applied as an adhesive to any surface or substrate capable of receiving the adhesive. The surface to which the preferred nitrile rubber can be bonded can be any surface capable of receiving the adhesive such as a glass, plastic, nylon or fabric surface, and is preferably a metal surface selected from any of the common structural metals such as iron, steel (including stainless steel, clean cold-rolled steel, grit-blasted steel, and phosphatized steel), lead, aluminum, copper, brass, bronze, Monel metal, nickel, zinc, and the like. To bond the various substrates described above, the present adhesive may be applied to one or both of the surfaces or substrates to be bonded, after which the substrates are contacted under conditions sufficient to create an adhesive bond.

In view of the good pre-bake resistance of the adhesive compositions of the present invention, they can be utilized for making seals for automobile parts and other rubber-to-metal bonded assemblies that use NBR elastomer such as: nitrile rubber engine mounts, vibration mounts, rubber rolls, gaskets, and wire and cable.

The invention will be better understood by reference to the following examples which serve to illustrate, but to limit the present invention.

EXAMPLE 1

The following compositions were made and tested with regard to different types of reactive fillers or curing agents.

|  | Control | 1 | 2 | 3 |
|---|---|---|---|---|
| P/R/F RESIN* | 32.9 | 28 | 28 | 28 |
| GAMMA POM** | 7 | 6 | 6 | 6 |
| CARBON BLACK | 1.2 | 1 | 1 | 1 |
| MARASPERSE | 1.2 | 1 | 1 | 1 |
| TITANIUM DIOXIDE | 10.6 | 9 | 9 | 9 |
| HISIL 233 | 11.8 | 10 | 10 | 10 |
| ZINC OXIDE |  | 15 |  |  |
| ZINC PHOSPHATE |  |  | 15 |  |
| CALCIUM CARBONATE. |  |  |  | 15 |
| CHLORINATED NATURAL RUBBER LATEX | 35.3 | 30 | 30 | 30 |

*Pyrogallol/Resorcinol/Formaldehyde
**Gamma-polyoxymethylene

The above adhesive compositions were prepared and tested as follows:

Adhesive preparation—A BB mill and paint shaker were used to prepare the adhesives for this application. A hard walled container was filled ⅓ of the volume with either ceramic or steel beads. These were usually ¼'" or smaller in diameter. The beads were used as grinding media. The adhesive was then weighed out properly into the container filling another ⅓ of the volume of the container. Then with the BB mill ⅔ full it was placed on a conventional paint shaker for a period of 2 hours or until an average particle size of about 1 mil was achieved. The adhesive was then separated from the grinding media and ready for application to the substrate. The adhesive was typically prepared between 20% and 50% solids in water but preferably between 30% and 40% solids in water.

Adhesive application—Several common application methods were employed to transfer adhesive from container to the metal substrate. These can include spaying, dipping, or brushing. The adhesive will look like paint once it has dried on the substrate. Dry film thickness can be very important to the quality of bond. The dry film thickness can range from 0.1 mils to 2.0 mils thick but preferably between 0.5 mils and 1.0 mils thick. When testing adhesives in the lab a one square inch area of the substrate was typically coated and evaluated for adhesion quality.

Substrate—The rigid substrate can vary greatly and can include: copper, brass, stainless steel, cold rolled steel, hot rolled steel, and steel with different conversion coatings such as zinc phosphatized or iron phosphatized. The data provided was from steel coupons that had a microcrystalline zinc phosphate surface conversion. The substrate can also be materials other than metal like fabric and nylon for example.

Curing—The nitrile elastomer to be bonded will normally be freshly milled to reincorporate materials that have migrated to the surface. The rubber was then cured to the shape desired in a mold using desired heat and pressure. The molding can take place in a variety of molding methods. These include compression, transfer, or injection. In compression, the rubber was placed in the mold before it closes. When transfer molding, rubber was pushed into a closed mold with a piston thru small sprue holes under pressure. Injection molding again moves rubber into the mold via small sprue holes but in this case a screw mechanism was used rather than a piston. The rubber was then held under pressure and temperature until the rubber has cured chemically to the desired state of cure.

Pre-bake or precure—When loading complex or large molds sometimes parts sat in hot molds for a period of time before the rubber was injected and under pressure for the cure to begin. This time where the adhesive was exposed to the hot mold prior to mating with the rubber is called pre-bake. It is desirable for an adhesive to resist pre-bake and precure and maintain the ability to bond rubber after this exposure to heat. The higher the mold temperature the more likely a problem might occur due to heat exposure. The adhesives crosslink or cure when exposed to high temperature. The adhesives of this invention tolerated temperatures as high as 380 F. for periods as long as 9 minutes and still provided excellent adhesion to nitrile rubber compounds. The results shown in the various tables below were generated using a mold temperature of 380° F. and a sulfur cured nitrile rubber compound.

Testing—The rubber can be removed from the substrate in several ways. One of the simplest ways is to tear the rubber section away from the substrate using pliers. The test area where adhesive is applied is typically one square inch. A percentage is recorded for the amount of the rubber remaining on this one inch area after the bond has been destroyed. A bond having 100% rubber retention is as good as the bond can be. It can also be written as 100 rubber for 100% rubber retention or 90 rubber for 90% retention.

The results from the bond testing are below.

|  | 0' PRE-BAKE | 3' PRE-BAKE | 6' PRE-BAKE | 9' PRE-BAKE |
|---|---|---|---|---|
| Control | 100 rubber | 100 rubber | 100 rubber | 88 rubber |
| 1 | 100 rubber | 100 rubber | 100 rubber | 90 rubber |
| 2 | 100 rubber | 100 rubber | 95 rubber | 100 rubber |
| 3 | 100 rubber | 100 rubber | 90 rubber | 90 rubber |

As apparent from the above table, reactive fillers such as zinc oxide, magnesium oxide, and calcium carbonate provided suitable pre-baked times.

EXAMPLE 2

The following compounds where formulated with regard to testing of different types of precipitated silica which can be utilized.

|  | Control | 4 | 5 | 6 |
|---|---|---|---|---|
| P/R/F RESIN | 31.1 | 28 | 28 | 28 |
| GAMMA POM | 6.7 | 6 | 6 | 6 |
| CARBON BLACK | 1.1 | 1 | 1 | 1 |
| MARASPERSE | 1.1 | 1 | 1 | 1 |
| TITANIUM DIOXIDE | 10 | 9 | 9 | 9 |
| ZINC OXIDE | 16.7 | 15 | 15 | 15 |
| HISIL 233 |  | 10 |  |  |
| CABOSIL CP304 |  |  | 10 |  |
| AEROSIL 200 |  |  |  | 10 |
| CHLORINATED RUBBER LATEX | 30 | 30 | 30 | 30 |

The above formulations were prepared and tested in the same manner as previously described. The results are as follows.

|  | 0' PRE-BAKE | 3' PRE-BAKE | 6' PRE-BAKE | 9' PRE-BAKE |
|---|---|---|---|---|
| Control | 100 rubber | 23 rubber | 50 rubber | 0 rubber |
| 4 | 100 rubber | 98 rubber | 100 rubber | 98 rubber |
| 5 | 100 rubber | 100 rubber | 100 rubber | 93 rubber |
| 6 | 100 rubber | 73 rubber | 80 rubber | 80 rubber |

As apparent from the above table, the use of precipitated silica gave good results.

EXAMPLE 3

The following compounds were formulated with regard to testing different types of phenolic resins.

|  | 7 | 8 |
|---|---|---|
| P/R/F RESIN | 28 |  |
| BKUA 2370 PHENOLIC RESOLE |  | 28 |
| CARBON BLACK | 1 | 1 |
| MARASPERSE | 1 | 1 |
| TITANIUM DIOXIDE | 9 | 9 |
| HISIL 233 | 10 | 10 |
| ZINC OXIDE | 15 | 15 |
| GAMMA POM | 6 | 6 |
| CHLORINATED RUBBER LATEX | 30 | 30 |

The above formulations were prepared and tested using the same procedure as described earlier. The results were as follows.

|  | 0' PRE-BAKE | 3' PRE-BAKE | 6' PRE-BAKE | 9' PRE-BAKE |
|---|---|---|---|---|
| 7 | 100 rubber | 100 rubber | 100 rubber | 100 rubber |
| 8 | 98 rubber | 100 rubber | 65 rubber | 70 rubber |

Once again, good results were obtained using the compositions of the present invention.

While in accordance with the patent statutes the best mode and preferred embodiment has been set forth, the scope of the invention is not limited thereto, but rather by the scope of the attached claims.

What is claimed is:

1. An aqueous adhesive composition, comprising:
a phenolic novolac or resole resin, a chlorinated natural rubber, a precipitated silica, and a zinc or calcium oxide, phosphate, or carbonate reactive fillers.

2. An aqueous adhesive composition according to claim 1, wherein the amount of said chlorinated natural rubber is from about 50 to about 150 parts by weight per 100 parts by weight of dry phenolic resin, wherein the amount of said precipitated silica is from about 10 to about 50 parts by weight per 100 parts by weight of dry phenolic resin, and wherein an amount of said reactive fillers is from about 25 to about 75 parts by weight per 100 parts by weight of dry phenolic resin.

3. An aqueous adhesive composition according to claim 2, wherein said precipitated silica has an average particle size of from about 0.010 to about 0.030 microns and a surface area of from about 130 to about 170 square meters per gram, and wherein said chlorinated natural rubber contains from about 60% to about 75% by weight of chlorine based upon the total weight of said chlorinated natural rubber.

4. An aqueous adhesive composition according to claim 3, for bonding nitrile rubber to metals, wherein said reactive fillers is zinc oxide, zinc phosphate, or calcium carbonate, or combinations thereof, and wherein the amount of said chlorinated natural rubber is from about 90 to about 115 parts by weight per 100 parts by weight of said dry phenolic, wherein the amount of said precipitated silica is from about 25 to about 45 parts by weight per 100 parts by weight of said dry phenolic resin, and wherein the amount of said re-active fillers is from about 45 to about 60 parts by weight per 100 parts by weight of said dry phenolic resin.

5. An aqueous adhesive composition according to claim 4, for bonding nitrile rubber to metals, wherein said phenolic novolac resin is Pyrogallol/Resorcinol/Formaldehyde, wherein said chlorinated natural rubber contains from about 65 to about 68% by weight of chlorine based upon the total weight of chlorinated natural rubber, wherein said precipitated silica has a average particle size of about 0.015 to about 0.025 microns and a surface area of from about 140 to about 150 square meters per gram.

6. An aqueous adhesive composition according to claim 1, wherein said composition has a pre-bake resistance at 380° F. for 3 minutes of at least 80% nitrile rubber tear.

7. An aqueous adhesive composition according to claim 3, wherein said composition has a pre-bake resistance at 380° F. for 6 minutes of at least 90% nitrile rubber tear.

8. An aqueous adhesive composition according to claim 5, wherein said composition has a pre-bake resistance at 380° F. for 9 minutes of at least 95% of nitrile rubber tear.

9. A nitrile rubber bonded to a metal by the composition of claim 1.

10. A nitrile rubber bonded to a metal by the composition of claim 2.

11. A nitrile rubber bonded to a metal by the composition of claim 3.

12. A nitrile rubber bonded to a metal by the composition of claim 4.

13. A nitrile rubber bonded to a metal by the composition of claim 5.

14. A nitrile rubber bonded to a metal by the composition of claim 6.

15. A nitrile rubber bonded to a metal by the composition of claim 7.

16. A nitrile rubber bonded to a metal by the composition of claim 8.

17. An aqueous adhesive composition, comprising:

a phenolic novolac resin, a chlorinated natural rubber, a precipitated silica, and a reactive filler, said phenolic novolac resin prepared from at least a trihydroxy aromatic compound.

18. An aqueous adhesive composition according to claim 17, wherein said reactive filler is a) an oxide or salt of iron, nickel, cobalt, copper, or b) aluminum; or an oxide, phosphate, or carbonate of zinc or calcium; c) or combinations thereof, wherein said reactive filler is present in an amount from about 25 to about 75 parts by weight per 100 parts by weight of dry phenolic resin, wherein said chlorinated natural rubber is present in an amount from about 50 to about 150 parts by weight per 100 parts by weight of dry phenolic resin, and wherein said precipitated silica is present in an amount from about 10 to about 50 parts by weight per 100 parts by weight of dry phenolic resin.

19. An aqueous adhesive composition according to claim 18, wherein said phenolic novolac resin is Pyrogallol/Resorcinol/Formaldehyde, wherein said precipitated silica has an average particle size of from about 0.010 to about 0.030 microns and a surface area of from about 130 to about 170 square meters per gram, wherein said chlorinated natural rubber contains from about 60% to about 75% by weight of chlorine based upon the total weight of said chlorinated natural rubber, and wherein said reactive filler is said oxide phosphate or carbonate of zinc or calcium.

20. An aqueous adhesive composition according to claim 19, wherein said composition has a pre-bake resistance at 380° F. for 3 minutes of at least 80% nitrile rubber tear.

* * * * *